April 30, 1940. B. MESTEKIN Re. 21,440

FASTENING DEVICE FOR JEWELRY

Original Filed Feb. 10, 1938 2 Sheets-Sheet 1

Inventor
Bernard Mestekin

By Sol Shappirio
Attorney

April 30, 1940. B. MESTEKIN Re. 21,440

FASTENING DEVICE FOR JEWELRY

Original Filed Feb. 10, 1938 2 Sheets-Sheet 2

Inventor
Bernard Mestekin

By Sol Shappirio
Attorney

Reissued Apr. 30, 1940

Re. 21,440

UNITED STATES PATENT OFFICE 21,440

FASTENING DEVICE FOR JEWELRY

Bernard Mestekin, Washington, D. C., assignor, by mesne assignments, to Reconstruction Finance Corporation, New York, N. Y., a corporation Original No. 2,133,901, dated October 18, 1938, Serial No. 189,857, February 10, 1938. Application for reissue October 14, 1939, Serial No. 299,518

11 Claims. (Cl. 24—241)

This invention relates to fastening devices or locks for jewelry, particularly of the type of necklaces and bracelets, or other link, chain or rope type articles.

Such articles of jewelry are usually connected together by a clasp provided with a hook or spring snap, which fastening ordinarily snaps into engagement with a body or socket member. Such hooks and snaps employed in connection with jewelry are usually of relatively light construction and thereby easily broken. In addition, they do not give protection against accidental or surreptitious uncoupling of the connection, since the spring snaps and similar forms of catches heretofore used are easily opened or detached.

Among the objects of the present invention is the production of a lock or fastening device for jewelry of the link type, particularly for necklaces and bracelets, in which a simple structure affording positive protection against undesired uncoupling or segregation of parts is provided.

Other and further objects and advantages will appear from the more detailed description set forth below, it being understood, however, that this more detailed description is given by way of illustration and explanation only and not by way of limitation, since various changes therein may be made by those skilled in the art without departing from the scope and spirit of the present invention.

Figure 1:
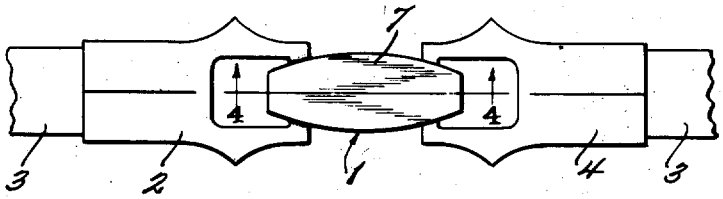
Figure 2:
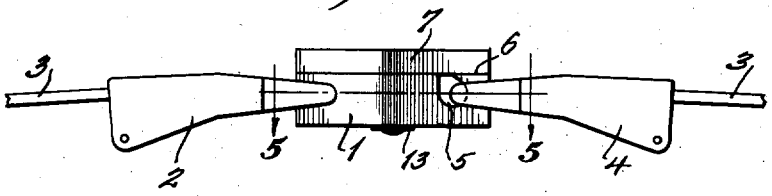
Figure 3:
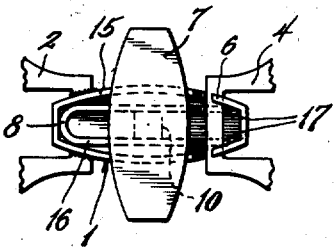
Figure 4:
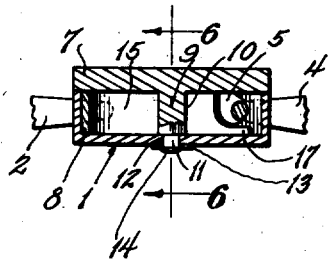
Figure 5:
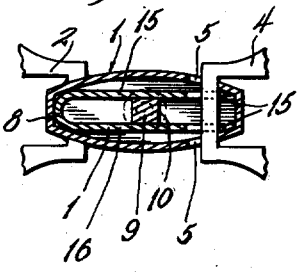
Figure 6:
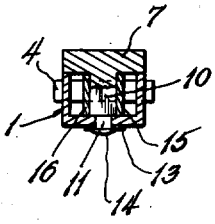
Figure 7:
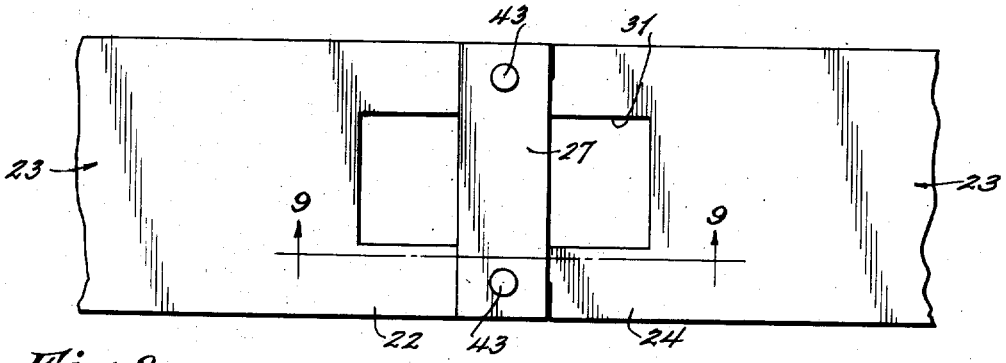
Figure 8:
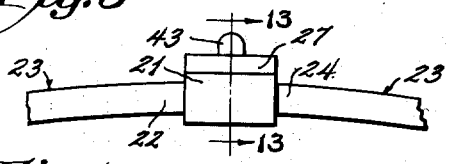
Figure 9:
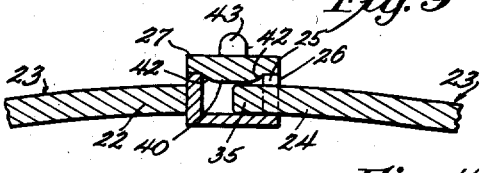
Figure 10:
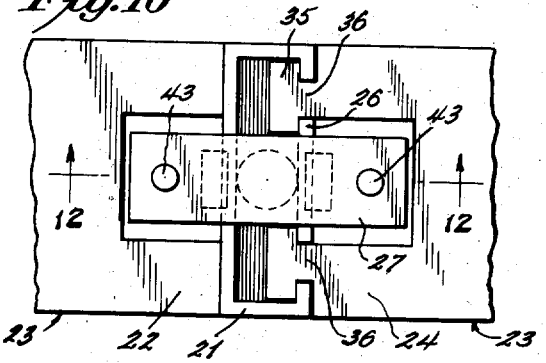
Figure 11:
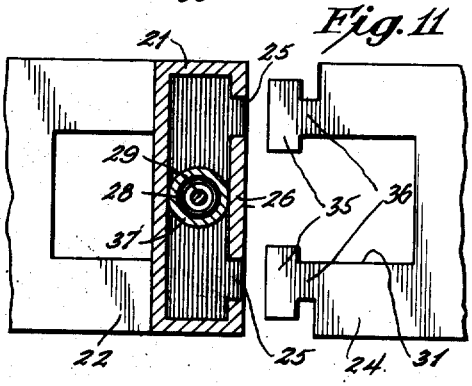
Figure 12:
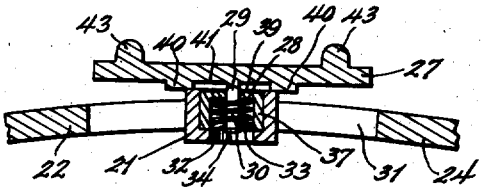
Figure 13:
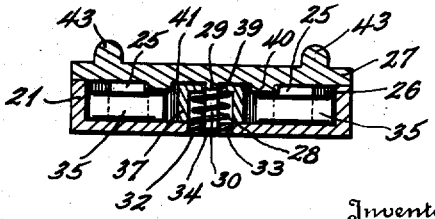
Figure 14:
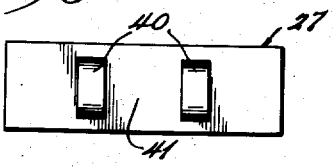

In connection with that more detailed description, there is shown in the accompanying drawings, in Fig. 1, a top elevation of a fastening device in accordance with the present invention; in Fig. 2, a side elevation of a fastening device made in accordance with the present invention; in Fig. 3, a fragmentary view of the device of Fig. 1, showing the lock in open position; in Fig. 4, a section on the line 4—4 of Fig. 1; in Fig. 5, a section on the line 5—5 of Fig. 2; in Fig. 6, a section on the line 6—6 of Fig. 4; in Fig. 7, a top plan view of a modified form of fastening device; in Fig. 8, a side elevation of the fastening device; in Fig. 9, a vertical section on line 9—9 of Fig. 7; in Fig. 10, a top plan view showing the cover in open position; in Fig. 11, a top plan view showing the cover removed; in Fig. 12 a vertical section on line 12—12 of Fig. 10; in Fig. 13, a transverse section on line 13—13 of Fig. 8; and in Fig. 14, a plan view of the cover member.

In accordance with the present invention as illustrated in the drawings, a lock or fastening device is utilized that is positive in its action, but readily utilizable for detachment of connected parts, the device being of simple construction.

In accordance with the present invention as illustrated in the drawings, a body member 1 of desirably elongated configuration is provided, one end having the usual link element 2 constituting a link of a chain or necklace or bracelet 3, the link element 2 being attached to the body member 1 by more or less permanent fastening means, and the body member 1 and link 2 remain preferably in permanent attachment. For locking the other end of the rope or chain or link element, the link 4 is adapted to be received in a slot 5 formed in the body member 1, the slot 5 extending to one face 6 of the body member 1. In order to hold the link 4 in position in the slot 5, a cover member 7 of configuration desirably conforming with that of body 1 is carried on the latter and adapted to reciprocate or swivel on the body member 1, so that the elongated cover 7 may be swung to the open position, as shown in Fig. 4, in order to expose the open end of the slot 5 and permit removal of the link 4 therefrom. Desirably the cover member 7 is spring pressed in its several positions in order to assure more positive action, and for this purpose a spring member 8 carried on or in the body member 1 is provided. In the construction shown, the cover 7 may be carried on or made integral with a shaft 9 mounted in the body member 1, the latter desirably being hollow or recessed for purposes herein set forth. The shaft 9 has an angular shank, such as 10, which may desirably be square in cross section, the furthermost end 11 of the shaft 9 being reduced in size and round to extend into an opening 12 in the base of a body member 1, and to serve as a link or swivel joint, a washer 13 easing movement of the cover 7, and the other end of the reduced end 11 being swaged over the washer 13, as indicated at 14, in order to maintain the parts in position within the hollow body member 1. The leaf spring 8 is desirably placed with the sides 15 and 16 of the spring 8 engaging against the angular shank 10 of the shaft 9, the spring 8 desirably abutting at opposite ends of the hollow body portion, the outer ends of the leaf spring being cut away, as shown at 17, to conform with the configuration of the slot 5, and to permit insertion of the link 4 in the slot 5.

A structure of the character described enables simple operation for attachment and detachment of the link 4 of the bracelet, necklace or similar article. For this purpose, cover member 7 is swung into the open position, as illustrated in Fig. 3, so that the slot 5 is made available for reception of the link 4. The latter is placed in position in the slot 5, and the cover 7 then returned to the closed position, so that the link is held in locked position. A structure of this character is simple to produce, and gives a positive lock of ornamental appearance desirably utilizable with jewelry. The lock or fastening device may be made of any desired configuration and from any desired material, and may vary in size and ornamentation, as well as configuration, to adapt it to any particular style of article of jewelry. There is no clasp or snap to become disengaged, and positive locking is accordingly secured against accidental detachment.

In the modified form of device shown in Figs. 7–14, a form of lock or fastening device is illustrated, which is more desirably used by being placed transverse of the bracelet, necklace, or similar article, whereas the device of Figs. 1 to 6 more desirably forms part of the longitudinal link development.

In accordance with the modified form of lock or fastening device illustrated in Figs. 7–14, there is shown a body member 21 of desirably elongated configuration placed transversely on a link element 22 constituting a link of a chin, or necklace or bracelet 23, which link element 22 may be attached permanently to the body member 21. For locking the other end of the rope or chain or aggregate of links, the link 24 is provided having a cut-out portion 31 forming T-shaped projections 35, having reduced portions 36, adapted to be inserted into the slots 25 carried in a wall 26 of the desirably hollow body portion 21. When the reduced neck portions 36 of the link 24 are placed in the slots 25, the enlarged head members 35 of the T-shaped projections serve to hold the link 24 in position. While two such T-shaped projections 35 are shown, together with two cooperating slots 25, it is apparent that the number of such T-shaped projections and corresponding slots may be changed to suit any particular set of circumstances, and one such projection and corresponding slot may be employed, or three or more may be utilized, but two give a satisfactory result for structures of the character illustrated. In order to prevent the link 24 from being detached undesirably when placed in position in the slot 25, a cover member 27 is provided, desirably conforming in configuration with that of body member 21, the cover being carried on the body 21 and adapted to reciprocate or swivel on said body member 21, so that the elongated or other cover 27 may be swung to open and closed positions as illustrated more particularly in Figs. 7 and 10 of the drawings. When the cover is in the closed position shown in Fig. 7 with the link member 24 placed in position in the openings 25, the open ends of the openings 25 are closed by the cover member, so that the link cannot be detached. When the cover is moved to the open position shown in Fig. 10, the T-shaped projection 35 may be removed from the slots 25, enabling the links to be detached.

Desirably the cover member 27 is spring pressed in order to insure more positive action, and for this purpose a coil spring 28 is desirably provided and carried within the hollow body member 21. For this purpose, the cover 27 is provided with a shaft 29 to which it is desirably rigidly secured, so that the cover will reciprocate or move with movements of the shaft 29. The body 21 is provided with a housing 37 secured thereto and of hollow character to receive the coil spring 28. The housing 37 is attached to the body member 21. An opening 39 in the upper face of the housing 37 permits the shaft 29 to extend therethrough, so that the coil spring 28 surrounds the shaft 29 at its shank portion 30, the latter being carried through a washer 33 and swaged at its end 34 to hold the parts in position. The base of the body member 21 is provided with an opening 32 in which the washer 33 may move.

Desirably the under face of the cover 27 is provided with shoulders 40 between which shoulders there is a recess 41 of a size adapted to receive the housing 37 when the cover is in closed position, and the shoulders 40 are within the hollow portion of the body member 21. The shoulders 40 are desirably provided with bevelled edges 42, so that when the cover is moved from closed position to open position, the bevelled edges of the shoulders 40, 40 rise up on the edges of the body member 21 to compress the coil spring 28 within the housing 37 as particularly shown in Fig. 12, so that the cover is held rigidly in position by the coiled spring 28. In the closed position, as particularly illustrated in section in Fig. 13, the shoulders 40 drop down into the hollow body member, the recess 41 receiving the upper portion of the housing 37, the spring 28 urging the cover into such closed position and maintaining the parts rigidly against accidental displacement. Desirably the cover may be provided with knobs 43 to enable it to be moved readily from one position to the other.

The operation of this modified form of lock or fastening device will be obvious from the constructions described above, whereby it will be seen by either of the devices illustrating the invention of the present case, positive locking against accidental or surreptitious displacement of the link element is avoided.

What I claim is:

1. A fastening device for necklaces, bracelets and similar articles of jewelry comprising a hollow, walled body member one wall of which is provided with an open ended slot extending to one face of said body member, a spring housed within said hollow body member, a cover member carried on said body member and reciprocable thereon to expose and close said slot, means integral with said cover member in engagement and co-acting with the spring to retain the cover member either in the open or closed position.

2. A fastening device for necklaces, bracelets and similar articles of jewelry comprising a body member provided with an open ended slot extending to one face of said body member, a shaft mounted for rotation on said body member, said shaft having an angular shank, a leaf spring on said body member, side portions of the spring pressing against the angular shaft, a cover member for the body, said cover being mounted on said shaft and rotatable therewith to expose and close said slot.

3. A fastening device for necklaces, bracelets and similar articles of jewelry comprising an elongated hollow body member provided with an open ended slot extending to one face of said body member, a shaft mounted for rotation on said body member, said shaft having an angular shank positioned within the hollow portion of the body member, a leaf spring within said hollow body member, side portions of the spring pressing against the angular shaft, an elongated cover member for the body, said cover being mounted on said shaft for rotation therewith to expose and close said slot.

4. A fastening device for necklaces, bracelets and similar articles of jewelry comprising an elongated hollow body member provided with open ended slots extending to one face of said body member, a shaft mounted for rotation within the hollow portion of said body member, a cover member mounted on said shaft and rotatable therewith to open and close the hollow portion of the body member and thereby to close or open the slot in the face of said body member, a coiled spring surrounding said shaft and within the hollow body member and means integral with said cover member in engagement and co-acting with the spring to retain the cover member either in the open or closed position.

5. A fastening device for necklaces, bracelets and similar articles of jewelry comprising an elongated hollow body member provided with open ended slots extending to one face of said body member, a shaft mounted for rotation within the hollow portion of said body member, a cover member mounted on said shaft and rotatable therewith to open and close the hollow portion of the body member and thereby to close or open the slot in the face of said body member, said shaft having a shoulder plate at its lower end, the hollow body member having an apertured plate receiving said shaft and spaced above said shoulder plate, and a coiled spring surrounding said shaft and disposed between said plates, said cover member having cam-like portions on its lower face adapted to ride onto said apertured plate when the cover is moved from the closed to the open position.

6. A fastening device for necklaces, bracelets and similar articles of jewelry comprising, a hollow body member provided with an open-ended slot extending to one face of said body member, a cover rotatably mounted on said body member and rotatable to open and close the slot, a spring within the body member, and means rotatable with said cover in constant engagement with and co-acting with the spring to retain the cover member at least in a closed position, said means permitting the cover to remain in open position when manually moved to such position.

7. A fastening device for necklaces, bracelets and similar articles of jewelry comprising, a hollow body member provided with an open ended slot extending to one face of said body member, a cover member having a shaft by which it is rotatably mounted on the body member to open or close the slot, and a spring within the body member and co-acting with the shaft to retain the cover member in a closed position, the co-action between the spring and shaft permitting the cover to remain in open position when manually moved to such position.

8. A fastening device for necklaces, bracelets and similar articles of jewelry comprising, a hollow body member provided with an open-ended slot extending to one face of said body member, a cover member rotatably mounted on the body member to open or close the slot, a projection extending from the cover member into the body member, and a spring housed within the body member and in constant engagement with and operative against said projection to retain the cover member in a closed position, and permitting the cover member to remain in open position when manually moved to such position.

9. A fastening device for articles of jewelry comprising, a hollow, walled body member, one wall of which is provided with an open-ended slot extending to the face of said body member, a cover member mounted on the body member and rotatable thereon to expose and close said slot, means for retaining the cover member in at least a closed position, said means comprising a spring and a co-operating flat-sided shaft against which the spring bears, one of said means being contained within the body member and the other means being carried by and reciprocable with the cover member.

10. A fastening device for articles of jewelry comprising, a hollow body member having an open-top slot, a cover member centrally pivoted on said body member, said cover member having a square shaft extending into the body member and pivotally attaching it to the body member, said shaft being pivotal with the cover member and a spring contained within the body member and bearing against the square shaft to hold the cover member in the position of either closing the slot or exposing the open top of the same.

11. A fastening device for articles of jewelry comprising, a body member provided with an open-top slot, a cover member rotatably mounted on said body member and movable to close or open the slot, co-operating elements for holding the cover member at least in closed position, said co-operating elements comprising a U-shaped spring and a flat-sided member disposed between the legs of the spring and against which said legs bear, one of said elements being carried by and rotatable with the cover member and the other element being carried by the body member.

BERNARD MESTEKIN.